United States Patent
Eo et al.

[11] Patent Number: 5,974,102
[45] Date of Patent: Oct. 26, 1999

[54] SYNCHRONIZING CIRCUIT

[75] Inventors: Ik Soo Eo; Kwang Il Yeon; In Gi Lim, all of Daejon, Rep. of Korea

[73] Assignee: Electronics and Telecommunications Research Institute, Taejon-Shi, Rep. of Korea

[21] Appl. No.: 08/929,692

[22] Filed: Sep. 15, 1997

[30] Foreign Application Priority Data

Oct. 17, 1996 [KR] Rep. of Korea .................. 96-46457

[51] Int. Cl.⁶ .................................................. H04L 7/00
[52] U.S. Cl. ........................... 375/354; 326/96; 327/144
[58] Field of Search .............................. 375/354; 326/93, 326/96; 327/141, 144, 199, 215, 218, 154

[56] References Cited

U.S. PATENT DOCUMENTS 4,070,630 1/1978 Hepworth et al. ...................... 327/144
4,949,360 8/1990 Martin .
5,834,957 11/1998 Staton ...................................... 327/141

*Primary Examiner*—Stephen Chin
*Assistant Examiner*—Lenny Jiang
*Attorney, Agent, or Firm*—Cohen, Pontani, Lieberman & Pavane

[57] ABSTRACT

In case microcontroller and digital signal processing blocks are used together in one chip, there has been a problem in which the synchronization of the clocks are not consistent with each other when sending a signal from one block to another. In addition, when a reference clock is activated during a change of input signal, an incomplete interval has occurred. Accordingly, in order to solve the above mentioned problem, the present invention discloses a synchronizing circuit which uses a latch circuit("RS") consisted of NAND gates to synchronize an asynchronous input data and a reference clock, thereby solving the problem in which an incomplete interval occurs.

3 Claims, 3 Drawing Sheets

SYNCHRONIZING CIRCUIT

FIELD OF THE INVENTION

The present invention relates to a synchronizing circuit, and more particularly to a synchronizing circuit which synchronizes signals from the circuit to use a different clock into a reference clock.

BACKGROUND OF THE INVENTION

As the digital system becomes complicated, blocks having various functions must be integrated into one chip. For example, in case there is a block to process a digital signal and there is a microcontroller to control it, the velocity of the microcontroller is accordingly determined by an application program since it processes a software. However, in case there is a digital signal process block, the operational velocity is defined since the input digital signal format is fixed. Due to this fact, a different clock is used in one chip.

In this case, the microcontroller sets various data values and passes them to a digital signal processing block so as to control it. Then, when finishing calculating using the data values set by the microcontroller, the microcontroller block executes a next instruction by reading a digital signal processing value. During these procedures, in order for the microcontroller to execute a write(and/or read) operation, it requires an operation to write(and/or read) values into(and/ or from) a digital signal processing register. In these procedures, the address and data values that are synchronized with the clock of the microcontroller are recognized by the clock of the digital signal processing block. Therefore, it is required that the address and data values be synchronized with the clock of the digital signal processing block.

Also, the addresses and data values are controlled by a microcontroller as well as one value of a signal which is processed by the digital signal process block becomes one input signal of the microcontroller.

In this case, it is required that the control signal of the digital signal processing block be synchronized with the clock of the microcontroller, as with the control operation by the microcontroller. As such, it is necessarily required that multi-function blocks operating at different clocks in one chip be synchronized with one another.

As such, after converting an input signal into a short pulse, the conventional synchronizing circuit is kept one block of the reference clock by the converted pulse. The synchronizing circuit consists of a ready circuit for converting the input signal into a short pulse and resetting using the short pulse, and a circuit for making a synchronized signal using the short pulse.

In addition, in an instant when the state of the input asynchronous signal is converted, the signal used to synchronize becomes unstable since a data is maintained unstable. Due to this problem, a stabilized input asynchronous signal is synchronized by means of a logic AND multiplying the input asynchronous signal to the reference signal and a delay. A synchronous signal is reset by sensing a falling interval of the input signal.

SUMMARY OF THE INVENTION

Accordingly, it is an object of the present invention to provide a synchronizing circuit which can delete an incomplete interval of signal by synchronizing the data asynchronously input into a reference clock with a reference clock signal and accordingly make it possible to use a complete interval of signal by always synchronizing an asynchronous input data with a clock.

BRIEF DESCRIPTION OF THE DRAWINGS

For fuller understanding of the nature and object of the invention, reference should be had to the following detailed description taken in conjunction with the accompanying drawings in which.

Similar reference characters refer to similar parts in the several views of the drawings.

DESCRIPTION OF THE INVENTION

Embodiments of the present invention will be described in detail by reference to the accompanying drawings.

Figure 1:
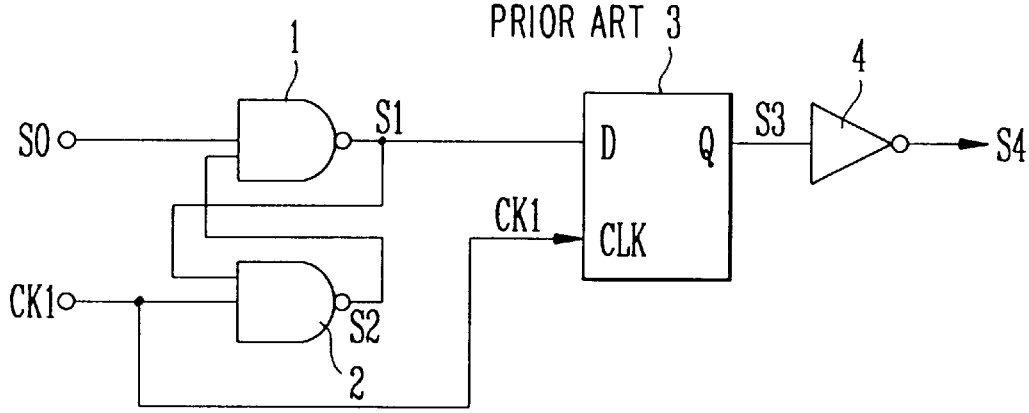
FIG.1 shows a conventional synchronizing circuit.
Figure 2:
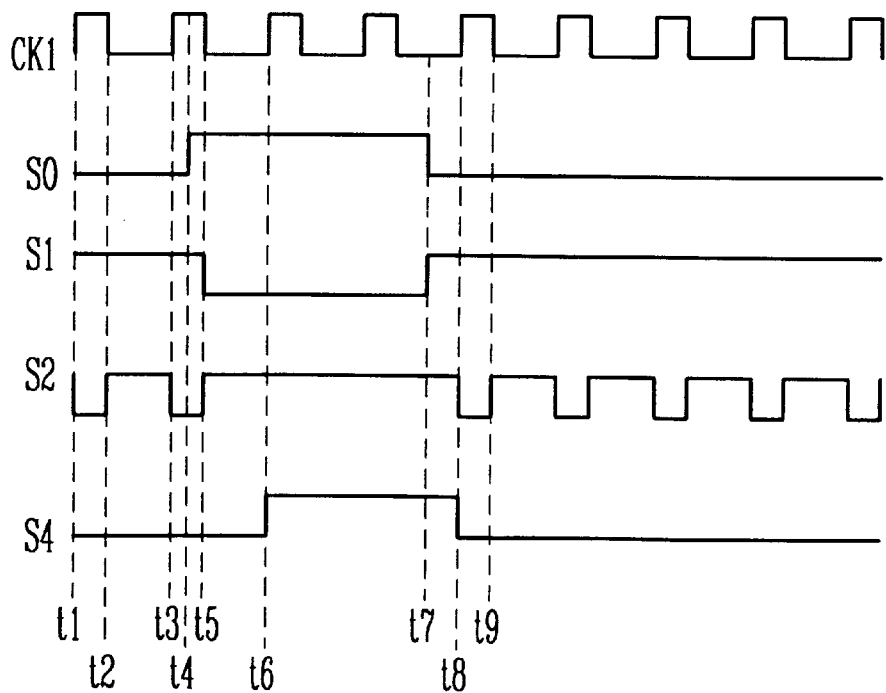
FIG.2 is input/output waveforms for explaining the operation shown in FIG.1.

FIG.1 shows a conventional synchronizing circuit which consists of a latch(RS) circuit to use NAND gates which input an asynchronous input data and a reference clock signal, respectively, and a D-latch circuit to stabilize the output of the latch circuit. The operation of this conventional synchronizing circuit will be explained by reference with FIG. 2 as follows.

The asynchronous input data S0 and the reference clock signal CK1 of an internal reference pager clock signal are input into any one input terminal of first and second NAND gates 1 and 2, respectively.

First, when the asynchronous input data S0 is Low and the reference clock signal CK1 is High(time t1 in FIG.2), the output signal S1 of the first NAND gate 1 turns High. Then, the output signal S2 of the second NAND gate 2 which inputs the output signal S1 of the first NAND gate 1 and the reference clock signal CK1 respectively turns Low. As the output S3 of the D-latch circuit 3 which inputs the output signal S1 of the first NAND gate 1 and the reference clock signal CK1 respectively turns High, it is kept High. The output (a synchronized output) of the inverter circuit 4 which inputs the output S3 of the D-latch circuit 3 turns Low(time t1 in FIG.2).

Next, when the asynchronous input data S0 is Low and the reference clock signal CK1 changes of High to Low(time t2 in FIG.2), the output signal S1 of the first NAND gate 1 is kept High. The output signal S2 of the second NAND gate 2 changes from Low to High.

When the asynchronous input data S0 is Low and the reference clock signal CK1 changes from Low to High(time t3 in FIG.2), the output signal S1 of the first NAND gate 1 is kept High as it is. The output signal S2 of the second NAND gate 2 changes of High to Low again.

When the asynchronous input data S0 changes from Low to High and the reference clock signal CK1 is High(time t4 in FIG.2), the output signal S2 of the second NAND gate 2 is kept Low as it is and the output signal S1 of the first NAND gate 1 is therefore kept High as it is.

When the input data S0 is High and the reference clock signal CK1 changes of High to Low(time t5 in FIG.2), the output signal S1 of the first NAND gate 1 changes of High to Low. The output signal S2 of the second NAND gate 2 changes from Low to High.

When the input data S0 is High and the reference clock signal CK1 changes from Low to High(time t6 in FIG.2), the output signal S1 of the first NAND gate 1 is kept Low. The output signal S2 of the second NAND gate 2 is kept High. Then, the output Q of the D-latch circuit 3 which inputs the output signal S1 of the first NAND gate 1 and the reference clock signal CK1 respectively changes of High to Low in accordance with the reference clock signal CK1. The output of the inverter 4 which inputs the output Q of the D-latch circuit 3 changes from Low to High(time t6 in FIG.2).

The asynchronous input data S0 changes of High to Low and the reference clock signal CK1 is Low(time t7 in FIG.2), the output signal S1 of the first NAND gate 1 changes from Low to High. The output signal S2 of the second NAND gate 2 is kept High.

When the asynchronous input data S0 is Low and the reference clock signal CK1 changes from Low to High(time t8 in FIG.2), the output signal S1 of the first NAND gate 1 is kept High. The output signal S2 of the second NAND gate 2 changes of High to Low. Then, the output Q of the D-latch circuit 3 which inputs the output signal S1 of the first NAND gate 1 and the reference clock signal CK1 respectively changes from Low to High in accordance with the reference clock signal CK1. The output(a synchronized output) of the inverter 4 which inputs the output Q of the D-latch circuit 3 changes of High to Low(time t8 in FIG.2).

Next, when the asynchronous input data S0 is Low and the reference clock signal CK1 changes of High to Low(time t9 in FIG.2), the output signal S1 of the first NAND gate 1 is kept High. The output signal S2 of the second NAND gate 2 changes from Low to High. That is, the output signal S2 of the second NAND gate 2 obtains an inverted output of the reference clock signal CK1.

However, when High is input into the first and second NAND gates 1 and 2 at the same time, the outputs of the first and second NAND gates 1 and 2 are set High. As a result, as the outputs of the first and second NAND gates feedbacks again and they turns High, there exists an unstable interval.

Figure 3:
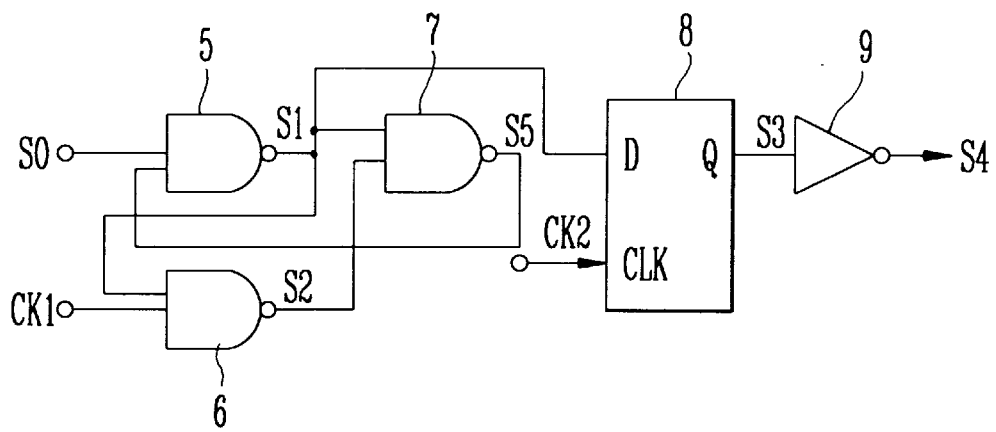
FIG.3 is shows a synchronizing circuit in accordance with the present invention.

A circuit to improve the above-mentioned unstable interval is shown in FIG.3.

Figure 4:
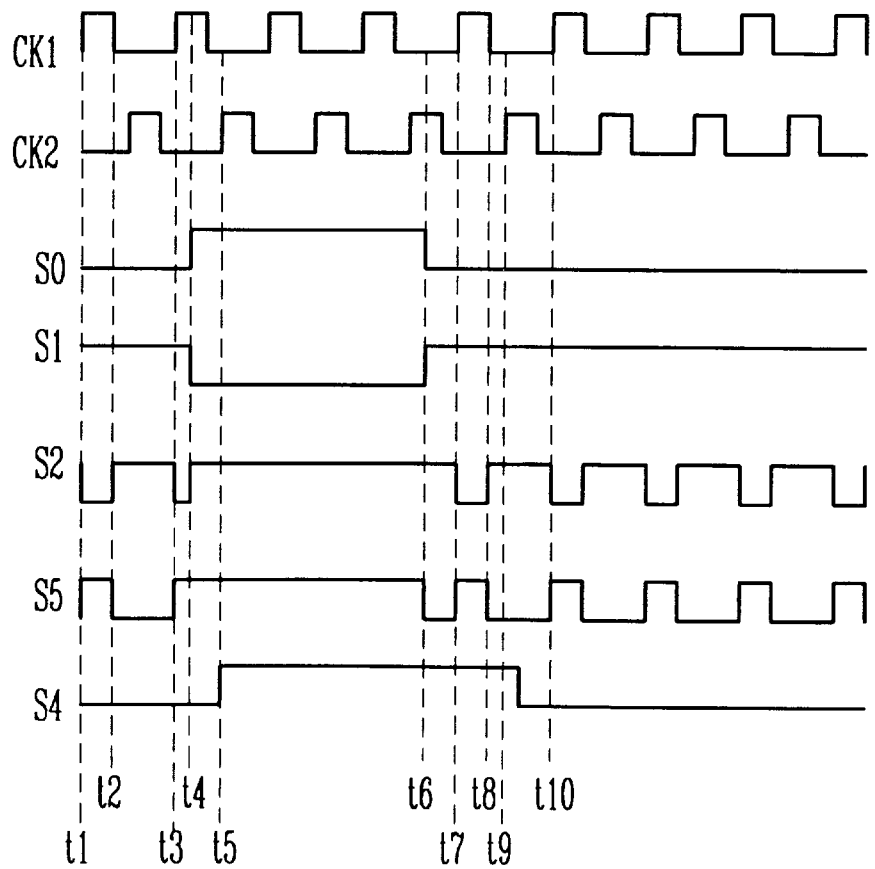
FIG.4 is input/output waveforms for explaining the operation shown in FIG.3.

FIG. 3 shows a synchronizing circuit which is complemented to prevent the circuit shown in FIG.1 of generating unstable signals. The operation of the synchronizing circuit according to the present invention will be explained by reference to FIG. 4.

The asynchronous input data S0 and the reference clock signal CK1 are input to any one input terminal of the first and second NAND gates 1 and 2, respectively.

First, when the asynchronous input data S0 is Low, the first reference clock signal CK1 is High and the second reference clock signal CK2 is Low(time t1 in FIG.4), the output signal S1 of the first NAND gate 1 turns High. Then, the output signal S2 of the second NAND gate 6 which inputs the output signal S1 of the first NAND gate 5 and the reference clock signal CK1 respectively turns Low. As the output S5 of the NAND gate 7 which inputs the output signals S1 and S2 of the first and second NAND gates 5 and 6 respectively turns High, it is input to another input terminal of the first NAND gate 5. The output S3 of the D-latch circuit 8 which inputs the output signal S1 of the first NAND gate 5 and the second reference clock signal CK2 respectively is kept High since the second reference clock signal CK2 is Low. The output signal(a synchronized output) of the inverter 9 which inputs the output S3 of the D-latch circuit 8 turns Low(time t1 in FIG.4).

Next, when the asynchronous input data S0 is Low, the first reference clock signal CK1 changes of High to Low, and the second reference clock signal CK2 is Low(time t2 in FIG.4), the output signal S1 of the first NAND gate 5 is kept High. The output signal S2 of the second NAND gate 6 changes from Low to High. The output signal S5 of the third NAND gate 7 changes of High to Low.

When the asynchronous input data S0 is Low, the first reference clock signal CK1 changes from Low to High, and the second reference clock signal CK2 is Low(time t3 in FIG.4), the output signal S1 of the first NAND gate 5 is kept High. The output signal S2 of the second NAND gate 6 changes of High to Low. The output signal S5 of the third NAND gate 7 changes from Low to High.

When the asynchronous input data S0 changes from Low to High, the first reference clock signal CK1 is High, and the second reference clock signal CK2 is Low(time t4 in FIG.4), the output signal S1 of the first NAND gate 5 changes of High to Low. The output signal S2 of the second NAND gate 6 changes from Low to High. The output signal S5 of the third NAND gate 7 is kept High.

When the asynchronous input data S0 is High, the first reference clock signal CK1 is Low, and the second reference clock signal CK2 changes from Low to High(time t5 in FIG.4), the output signal S1 of the first NAND gate 5 is kept Low. Each of the output signals S2 and S5 of the second and third NAND gates 6 and 7 is kept High, respectively. Then, the output S3 of the D-latch circuit 8 which inputs the output signal S1 of the first NAND gate 5 and the second reference clock signal CK2 respectively changes of High to Low since the second reference clock signal CK2 is High. The output(a synchronized output) of the inverter circuit 9 which inputs the output S3 of the D-latch circuit 8 turns High(time t5 in FIG.4). Next, the output signal S1 of the first NAND gate 5 is kept Low independently of the state of the first and second reference clock signals CK1 and CK2. The output signals S2 and S5 of the second and third NAND gates 6 and 7 are kept High, respectively.

The asynchronous input data S0 changes of High to Low, the first reference clock signal CK1 is Low, and the second reference clock signal CK2 is High(time t6 in FIG.2), the output signal S1 of the first NAND gate 5 changes from Low to High. The output signal S2 of the second NAND gate 6 is kept High. The output signal S5 of the third NAND gate 7 changes of High to Low. Then, the output S3 of the D-latch circuit 8 which inputs the output signal S1 of the first NAND gate 5 and the second reference clock signal CK2 respectively is High since the second reference clock signal CK2 is High. The output (a synchronized output) of the inverter 9 which inputs the output S3 of the D-latch circuit 8 is inverted to Low(time t6 in FIG.4).

When the asynchronous input data S0 is Low, the first reference clock signal CK1 changes from Low to High and the second reference clock signal CK2 is Low(time t7 in FIG.4), the output signal S1 of the first NAND gate 5 is kept High. The output signal S2 of the second NAND gate 6 changes of High to Low. The output signal S5 of the third NAND gate 7 changes from Low to High.

When the asynchronous input data S0 is Low, the first reference clock signal CK1 changes of High to Low and the second reference clock signal CK2 is Low(time t8 in FIG.4), the output signal S1 of the first NAND gate 5 is kept Low. The output signal S2 of the second NAND gate 6 changes from Low to High. The output signal S5 of the third NAND gate 7 changes of High to Low.

When the asynchronous input data S0 is Low, the first reference clock signal CK1 is High and the second reference clock signal CK2 is High(time t9 in FIG.4), the output signal S1 of the first NAND gate 5 is kept High. The output signal S2 of the second NAND gate 6 is kept High. The output signal S5 of the third NAND gate 7 is kept Low. When the asynchronous input data S0 is Low, the first reference clock signal CK1 changes from Low to High and the second reference clock signal CK2 is Low(time t10 in FIG.4), the output signal S1 of the first NAND gate 5 is kept High. The output signal S2 of the second NAND gate 6 is inverted in response to the first reference clock signal CK1. The output signal S5 of the third NAND gate 7 is obtained in response to the first reference clock signal CK1.

Therefore, in case the first reference clock signal is High, the output thereof changes to Low when the asynchronous input data changes to High. However, in case the first reference clock signal is Low, the output thereof changes to Low when the first reference clock signal to be input later changes to High with the state of the output thereof kept High. Therefore, a stabilized operation can be performed in the intervals when the first reference clock signals are Low. The latch circuit which inputs the output signal of the first NAND gate can obtain a stable value if it is driven by the second reference clock CK2 without overlapping with the first reference clock.

Figure 5:
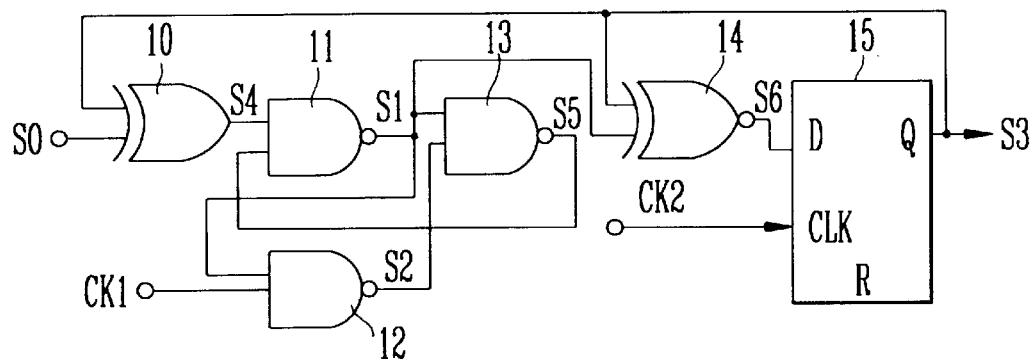
FIG.5 shows an another embodiment of a synchronizing circuit in accordance with the present invention.
Figure 6:
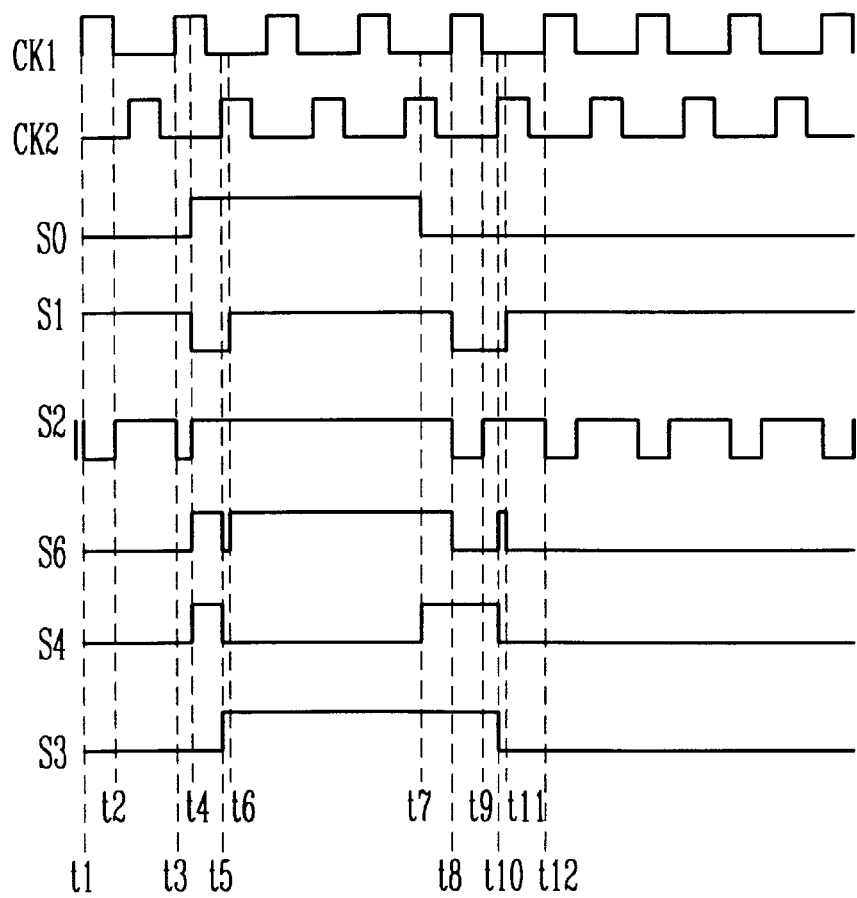
FIG.6 is input/output waveforms for explaining the operation shown in FIG.5.

FIG.5 shows an another embodiment of a synchronizing circuit in accordance with the present invention, which is complemented to prevent the output signal of the first NAND gate of changing when the synchronous input data in the circuit of FIG.3 changes in the active region of the latch circuit. The operation of the synchronizing circuit according to the present invention will be explained by reference to FIG. 6.

First, when the asynchronous input data S0 is Low, the first reference clock signal CK1 changes from Low to High and the second reference clock signal CK2 is Low(time t1 in FIG.6), the output signal S4 of the Exclusive OR gate 10 which inputs the first reference clock signal CK1 and the output signal S3 of the D-flip flop 15 turns Low. The output signal S1 of the first NAND gate 11 which inputs the output signal S4 of the Exclusive OR gate 10 turns to High. Then, the output signal S2 of the second NAND gate 12 which inputs the output signal S1 of the first NAND gate 11 and the first reference clock signal CK1 respectively turns Low. As the output signal S5 of the third NAND gate 13 which inputs the output signals S1 and S2 of the first and second NAND gates 11 and 12 respectively turns High, it is input to one input terminal of the first NAND gate 11. The output signal S6 of the Exclusive NOR gate 14 which inputs the output signal S1 of the first NAND gate 11 and the output signal S3 of the D-flip flop 15 turns Low. Then, the synchronized output of the output S3 of the D-flip flop circuit 15 which inputs the output signal S6 of the Exclusive NOR gate 14 and the second reference clock CK2 respectively is kept Low(time t1 in FIG.6).

When the asynchronous input data S0 is Low, the first reference clock signal CK1 changes from High to Low and the second reference clock signal CK2 is Low(time t2 in FIG.6), the output signal S4 of the Exclusive OR gate 10 which inputs the first reference clock signal CK1 and the output signal S3 of the D-flip flop 15 is kept Low. The output signal S1 of the first NAND gate 11 which inputs the output signal S4 of the Exclusive OR gate 10 is kept High. Then, the output signal S2 of the second NAND gate 12 which inputs the output signal S1 of the first NAND gate 11 and the first reference clock signal CK1 respectively changes from Low to High. As the output signal S5 of the third NAND gate 13 which inputs the output signals S1 and S2 of the first and second NAND gates 11 and 12 respectively turns High, it is input to any one input terminal of the first NAND gate 11. The output signal S6 of the Exclusive NOR gate 14 which inputs the output signal S1 of the first NAND gate 11 and the output signal S3 of the D-flip flop 15 is kept Low. Then, the output S3 of the D-flip flop circuit 15 is kept Low(time t2 in FIG.6).

When the asynchronous input data S0 is Low, the first reference clock signal CK1 changes from Low to High and the second reference clock signal CK2 is Low(time t3 in FIG.6), the output signal S4 of the Exclusive OR gate 10 which inputs the first reference clock signal CK1 and the output signal S3 of the D-flip flop 15 is kept Low. The output signal S1 of the first NAND gate 11 which inputs the output signal S4 of the Exclusive OR gate 10 is kept High. Then, the output signal S2 of the second NAND gate 12 which inputs the output signal S1 of the first NAND gate 11 and the first reference clock signal CK1 respectively changes from High to Low. As the output signal S5 of the third NAND gate 13 which inputs the output signals S1 and S2 of the first and second NAND gates 11 and 12 respectively changes from Low to High, it is input to one input terminal of the first NAND gate 11. The output signal S6 of the Exclusive NOR gate 14 which inputs the output signal S1 of the first NAND gate 11 and the output signal S3 of the D-flip flop 15 is kept Low. Then, the output S3 of the D-flip flop circuit 15 is kept Low(time t3 in FIG.6).

When the asynchronous input data S0 changes from Low to High, the first reference clock signal CK1 is High and the second reference clock signal CK2 is Low(time t4 in FIG.6), the output signal S4 of the Exclusive OR gate 10 which inputs the first reference clock signal CK1 and the output signal S3 of the D-flip flop 15 changes from Low to High. The output signal S1 of the first NAND gate 11 which inputs the output signal S4 of the Exclusive OR gate 10 changes from High to Low. Then, the output signal S2 of the second NAND gate 12 which inputs the output signal S1 of the first NAND gate 11 and the first reference clock signal CK1 respectively changes from Low to High. As the output signal S5 of the third NAND gate 13 which inputs the output signals S1 and S2 of the first and second NAND gates 11 and 12 respectively turns to High, it is input to any one input terminal of the first NAND gate 11. The output signal S6 of the Exclusive NOR gate 14 which inputs the output signal S1 of the first NAND gate 11 and the output signal S3 of the D-flip flop 15 changes form Low to High. Then, the output S3 of the D-flip flop circuit 15 is kept Low(time t4 in FIG.6).

When the asynchronous input data S0 is High, the first reference clock signal CK1 is Low and the second reference clock signal CK2 changes from Low to High(time t5 in FIG.6), the output signal S4 of the Exclusive OR gate 10 which inputs the first reference clock signal CK1 and the output signal S3 of the D-flip flop 15 changes from High to Low. The output signal S1 of the first NAND gate 11 which inputs the output signal S4 of the Exclusive OR gate 10 is kept Low. Then, the output signal S2 of the second NAND gate 12 which inputs the output signal S1 of the first NAND gate 11 and the first reference clock signal CK1 respectively is kept High. As the output signal S5 of the third NAND gate 13 which inputs the output signals S1 and S2 of the first and second NAND gates 11 and 12 respectively turns to High, it is input to any one input terminal of the first NAND gate 11. The output signal S6 of the Exclusive NOR gate 14 which inputs the output signal S1 of the first NAND gate 11 and the output signal S3 of the D-flip flop 15 turns to High. The output signal S6 of the Exclusive NOR gate 14 which inputs the output signal S1 of the first NAND gate 11 and the output signal S3 of the D-flip flop 15 changes from High to Low. Then, the output S3 of the D-flip flop circuit 15 which inputs the output signal S6 of the Exclusive NOR gate 14 and the output signal S3 of the D-flip flop circuit 15 respectively changes from Low to High(time t5 in FIG.6).

When the asynchronous input data S0 is High, the first reference clock signal CK1 is Low and the second reference clock signal CK2 is High(time t6 in FIG.6), the output signal S4 of the Exclusive OR gate 10 which inputs the first reference clock signal CK1 and the output signal S3 of the D-flip flop 15 is kept Low. The output signal S1 of the first NAND gate 11 which inputs the output signal S4 of the Exclusive OR gate 10 changes from Low to High. Then, the output signal S2 of the second NAND gate 12 which inputs the output signal S1 of the first NAND gate 11 and the first reference clock signal CK1 respectively is kept High. As the output signal S5 of the third NAND gate 13 which inputs the output signals S1 and S2 of the first and second NAND gates 11 and 12 respectively turns to Low, it is input to any one input terminal of the first NAND gate 11. The output signal S6 of the Exclusive NOR gate 14 which inputs the output signal S1 of the first NAND gate 11 and the output signal S3 of the D-flip flop 15 changes from Low to High. Then, the output S3 of the D-flip flop circuit 15 is kept High(time t6 in FIG.6).

When the asynchronous input data S0 changes from High to Low, the first reference clock signal CK1 is Low and the second reference clock signal CK2 is High(time t7 in FIG.6), the output signal S4 of the Exclusive OR gate 10 which inputs the first reference clock signal CK1 and the output signal S3 of the D-flip flop 15 changes from Low to High. The output signal S1 of the first NAND gate 11 which inputs the output signal S4 of the Exclusive OR gate 10 is kept High. Then, the output signal S2 of the second NAND gate 12 which inputs the output signal S1 of the first NAND gate 11 and the first reference clock signal CK1 respectively is kept High. As the output signal S5 of the third NAND gate 13 which inputs the output signals S1 and S2 of the first and second NAND gates 11 and 12 respectively turns to Low, it is input to any one input terminal of the first NAND gate 11. The output signal S6 of the Exclusive NOR gate 14 which inputs the output signal S1 of the first NAND gate 11 and the output signal S3 of the D-flip flop 15 is kept High. Then, the output S3 of the D-latch circuit 15 is kept High(time t7 in FIG.6).

When the asynchronous input data S0 is Low, the first reference clock signal CK1 changes from Low to High and the second reference clock signal CK2 is Low(time t8 in FIG.6), the output signal S4 of the Exclusive OR gate 10 which inputs the first reference clock signal CK1 and the output signal S3 of the D-flip flop 15 is kept High. The output signal S1 of the first NAND gate 11 which inputs the output signal S4 of the Exclusive OR gate 10 changes from High to Low. Then, the output signal S2 of the second NAND gate 12 which inputs the output signal S1 of the first NAND gate 11 and the first reference clock signal CK1 respectively changes from High to Low. As the output signal S5 of the third NAND gate 13 which inputs the output signals S1 and S2 of the first and second NAND gates 11 and 12 respectively turns to High, it is input to any one input terminal of the first NAND gate 11. The output signal S6 of the Exclusive NOR gate 14 which inputs the output signal S1 of the first NAND gate 11 and the output signal S3 of the D-flip flop 15 changes from High to Low. Then, the output S3 of the D-flip flop circuit 15 is kept High(time t8 in FIG.6).

When the asynchronous input data S0 is Low, the first reference clock signal CK1 changes from High to Low and the second reference clock signal CK2 changes is Low(time t9 in FIG.6), the output signal S4 of the Exclusive OR gate 10 which inputs the first reference clock signal CK1 and the output signal S3 of the D-flip flop 15 is kept High. The output signal S1 of the first NAND gate 11 which inputs the output signal S4 of the Exclusive OR gate 10 is kept Low. Then, the output signal S2 of the second NAND gate 12 which inputs the output signal S1 of the first NAND gate 11 and the first reference clock signal CK1 respectively changes from Low to High. As the output signal S5 of the third NAND gate 13 which inputs the output signals S1 and S2 of the first and second NAND gates 11 and 12 respectively turns to High, it is input to any one input terminal of the first NAND gate 11. The output signal S6 of the Exclusive NOR gate 14 which inputs the output signal S1 of the first NAND gate 11 and the output signal S3 of the D-flip flop 15 is kept Low. Then, the output S3 of the D-latch circuit 15 is kept High(time t9 in FIG.6).

When the asynchronous input data S0 is Low, the first reference clock signal CK1 is Low and the second reference clock signal CK2 changes from Low to High(time t10 in FIG.6), the output signal S4 of the Exclusive OR gate 10 which inputs the first reference clock signal CK1 and the output signal S3 of the D-flip flop 15 changes from High to Low. The output signal S1 of the first NAND gate 11 which inputs the output signal S4 of the Exclusive OR gate 10 is kept Low. Then, the output signal S2 of the second NAND gate 12 which inputs the output signal S1 of the first NAND gate 11 and the first reference clock signal CK1 respectively is kept High. As the output signal S5 of the third NAND gate 13 which inputs the output signals S1 and S2 of the first and second NAND gates 11 and 12 respectively turns to High, it is input to any one input terminal of the first NAND gate 11. The output signal S6 of the Exclusive NOR gate 14 which inputs the output signal S1 of the first NAND gate 11 and the output signal S3 of the D-flip flop 15 changes from Low to High. Then, the output signal S3 of the D-flip flop circuit 15 which inputs the output signal S6 of the Exclusive NOR gate 14 and the second reference clock signal CK2 respectively changes from High to Low(time t10 in FIG.6).

When the asynchronous input data S0 is Low, the first reference clock signal CK1 is Low and the second reference clock signal CK2 is High(time t11 in FIG.6), the output signal S4 of the Exclusive OR gate 10 which inputs the first reference clock signal CK1 and the output signal S3 of the D-flip flop 15 is kept Low. The output signal S1 of the first NAND gate 11 which inputs the output signal S4 of the Exclusive OR gate 10 changes from Low to High. Then, the output signal S2 of the second NAND gate 12 which inputs the output signal S1 of the first NAND gate 11 and the first reference clock signal CK1 respectively is kept High. As the output signal S5 of the third NAND gate 13 which inputs the output signals S1 and S2 of the first and second NAND gates 11 and 12 respectively turns to Low, it is input to any one input terminal of the first NAND gate 11. The output signal S6 of the Exclusive NOR gate 14 which inputs the output signal S1 of the first NAND gate 11 and the output signal S3 of the D-flip flop 15 changes from Low to High. Then, the output S3 of the D-flip flop circuit 15 which inputs the output signal S6 of the Exclusive NOR gate 14 and the second reference clock signal CK2 is kept Low(time t11 in FIG.6).

When the asynchronous input data S0 is Low, the first reference clock signal CK1 changes from Low to High and the second reference clock signal CK2 changes is Low(time t12 in FIG.6), the output signal S4 of the Exclusive OR gate 10 which inputs the first reference clock signal CK1 and the output signal S3 of the D-flip flop 15 is kept Low. The output signal S1 of the first NAND gate 11 which inputs the output signal S4 of the Exclusive OR gate 10 is kept High. Then, the output signal S2 of the second NAND gate 12 which inputs the output signal S1 of the first NAND gate 11 and the first reference clock signal CK1 respectively changes from High to Low. As the output signal S5 of the third NAND gate 13 which inputs the output signals S1 and S2 of the first and second NAND gates 11 and 12 respectively turns to High, it is input to any one input terminal of the first NAND gate 11. The output signal S6 of the Exclusive NOR gate 14 which inputs the output signal S1 of the first NAND gate 11 and the output signal S3 of the D-flip flop 15 is kept Low. Then, the output signal S3 of the D-flip flop circuit 15 which inputs the output signal S6 of the Exclusive NOR gate 14 and the second reference clock signal CK2 respectively is kept Low(time t1 in FIG.6). That is, the output signal S2 of the second NAND gate 12 is inverted in response to the first reference clock signal CK1.

As mentioned above, the present invention has the following outstanding effects compared with the conventional synchronizing circuit.

1. It can embody a high speed synchronizing circuit capable of operating more stably which having a simpler structure.
2. In case the number of registers used to control in a microcontroller are many, a circuit for synchronizing the registers is necessary. In this case, a plurality of the number of the gate can be reduced.
3. In a conventional synchronizing circuit, an occurrence of unstable signal causes a problem in a digital signal processing block which requires a high speed operation. However, the present invention may be applicable to the use of high speed clock because it can operate to the complete exclusion of the unstable operation.

The foregoing description, although described in its preferred embodiment with a certain degree of particularity, is only illustrative of the principles of the present invention. It is to be understood that the present invention is not to be limited to the preferred embodiments disclosed and illustrated herein. Accordingly, all expedient variations that may be made within the scope and spirit of the present invention are to be encompassed as further embodiments of the present invention.

What we claim:

1. A synchronizing circuit, comprising:
   a first NAND gate, having two inputs and an output signal receiving an asynchronous input data at one of the two inputs of the first NAND gate;
   a second NAND gate, having two inputs and an output signal, receiving the output signal of the first NAND gate and a first reference clock signal at said two inputs of the second NAND gate, respectively;
   a third NAND gate, having two inputs and an output signal, receiving the output signals of the first and second NAND gates at said two inputs of the third NAND gate, respectively, another of the two inputs of the first NAND gate receiving the output signal of the third NAND gate; and
   a D-latch circuit receiving the output signal of the first NAND gate and a second reference clock signal, for outputting a synchronizing signal in response to the second reference clock signal.

2. The synchronizing circuit as claimed in claim 1, wherein said synchronizing circuit further includes an inverter circuit, for inverting the synchronizing signal of the D-latch circuit to output a stabilized synchronizing signal.

3. A synchronizing circuit, comprising:
   an Exclusive OR gate, having two inputs and an output signal, receiving an asynchronous input data as one of the two inputs of the Exclusive OR gate;
   a first NAND gate, having two inputs and an output signal, receiving the output signal of the Exclusive OR gate as one of the two inputs of the first NAND gate;
   a second NAND gate, having two inputs and an output signal, receiving the output signal of the first NAND gate and a first reference clock signal at said two inputs of the second NAND gate, respectively;
   a third NAND gate, having two inputs and an output signal, receiving the output signals of the first and second NAND gates at the two inputs of the third NAND gate, another of the two inputs of the first NAND gate receiving the output signal of the third NAND gate;
   an Exclusive NOR gate, having two inputs and an output signal, receiving the output signal of the first NAND gate at any one of the two inputs of the Exclusive NOR gate; and
   a D-flip flop circuit receiving the output signal of the Exclusive NOR gate and a second reference clock signal, for outputting a synchronizing signal in response to the second reference clock signal and said synchronizing signal being connected to another of said two inputs of said Exclusive OR gate and another of said two inputs of said Exclusive NOR gate.

* * * * *